US006430715B1

United States Patent
Myers et al.

(10) Patent No.: US 6,430,715 B1
(45) Date of Patent: Aug. 6, 2002

(54) PROTOCOL AND BIT RATE INDEPENDENT TEST SYSTEM

(75) Inventors: Kenneth T. Myers; Douglas J. Gardner, both of Palm Harbor, FL (US)

(73) Assignee: Digital Lightwave, Inc.

( * ) Notice: Subject to any disclaimer, the term of this patent is extended or adjusted under 35 U.S.C. 154(b) by 0 days.

(21) Appl. No.: 09/533,582

(22) Filed: Mar. 23, 2000

Related U.S. Application Data

(60) Provisional application No. 60/154,686, filed on Sep. 17, 1999.

(51) Int. Cl.$^7$ .......................... G06F 11/00; G01R 31/28
(52) U.S. Cl. ........................ 714/704; 714/712
(58) Field of Search ................. 714/704, 708, 714/709; 375/321, 224; 359/110, 180

(56) References Cited

U.S. PATENT DOCUMENTS

| | | | | |
|---|---|---|---|---|
| 4,451,916 A | * | 5/1984 | Casper et al. .................. 714/4 |
| 4,475,210 A | * | 10/1984 | Couch ......................... 375/224 |
| 4,633,465 A | * | 12/1986 | Fitch et al. ................. 714/709 |
| 4,809,306 A | * | 2/1989 | Somer ......................... 375/376 |
| 4,941,161 A | * | 7/1990 | Cook ........................... 377/28 |
| 5,333,147 A | * | 7/1994 | Nohara et al. ............... 375/224 |
| 5,491,722 A | * | 2/1996 | Jones et al. ................. 375/224 |
| 5,557,647 A | * | 9/1996 | Kushige et al. ............. 375/371 |
| 5,617,238 A | * | 4/1997 | Bogdan et al. .............. 359/110 |
| 5,724,362 A | * | 3/1998 | Lau ........................... 714/704 |
| 5,774,242 A | * | 6/1998 | O'Sullivan et al. .......... 359/110 |
| 5,870,211 A | * | 2/1999 | Yoshida ...................... 359/110 |
| 6,084,931 A | * | 7/2000 | Powell, II et al. ........... 375/355 |
| 6,115,416 A | * | 9/2000 | Katsman et al. ............. 375/224 |
| 6,148,423 A | * | 11/2000 | Le Mouel et al. ........... 714/708 |

* cited by examiner

*Primary Examiner*—Albert Decady
*Assistant Examiner*—Joseph D. Torres
(74) *Attorney, Agent, or Firm*—Holland & Knight LLP

(57) ABSTRACT

A protocol and bit rate independent test system for detecting bit errors on a digital communications channel regardless of format or rate, comprising a receiver for receiving an input, a clock recovery unit, a threshold sampling circuit for providing at least two threshold detectors for respective two sampling points including at least one static sampling point positioned proximate to the center of an eye pattern and at least one dynamic sampling point, the output of which are sampled by the recovered clock and if the signal passes between the thresholds, an error signal is generated and counted.

28 Claims, 5 Drawing Sheets

PROTOCOL AND BIT RATE INDEPENDENT TEST SYSTEM

CROSS-REFERENCE TO RELATED APPLICATIONS

This application is a utility application based upon and claiming priority of provisional application No. 60/154,686, filed Sep. 17, 1999. The disclosure of the provisional application is incorporated herein in its entirety by reference.

BACKGROUND OF THE INVENTION

1. Field of the Invention

This invention relates to a protocol and bit rate independent test system for digital communication systems. More particularly, this invention relates to systems that are able to detect bit errors on a digital communications channel regardless of format or rate.

2. Description of the Background Art

In digital communication systems, particularly dense wavelength division multiplexed (DWDM) optical systems, multiple signal formats may exist on the same communications link at different wavelengths. It is useful to be able to extract a signal and determine its health. Hence, there is a need to have a protocol independent and bit rate independent test capability that can (1) detect a single defective bit, (2) monitor the traffic error rate and (3) provide a protection switch signal within milliseconds of exceeding the error threshold condition, and to embed such a test head on every wavelength of the communications system, such as a DWDM system, so as to support such systems where the traffic on different wavelength channels are different protocols and different bit rates. The channels will contain unknown protocols as purchased by the customers. In such a scenario, the customer can buy a wavelength of light and the service carrier does not control the rate or protocol of the traffic. This creates a difficult testing condition since the service provider needs a way to verify error free transmission, provide protection switching and location of the fault condition. The service provider therefore needs a test capability that is bit rate and protocol independent.

Heretofore it has been known that the performance of a communications link, such as a fiber optic link, known as Q factor measurement, is reflected by interpreting the eye pattern of the waveforms of a series of pulses. A typical eye pattern is depicted in FIG. 1. The optimal time for sampling the data signals and the optimal level (the threshold level) at which to distinguish between zeros and ones is the center of the eye. Further, it is known that the height of the central eye opening determines noise margin in receiver output, the width of the signal band at the corner of the eye depicts the jitter or variation in pulse timing in the system, the thickness of the signal line at top and bottom of the eye is proportional to noise and distortion in the receiver output, and transitions between top and bottom of the eye pattern show the rise and fall times of the signal that can be measured on the eye pattern. More complete descriptions of eye measurements (and of receivers and other components) can be found in the following references, the disclosures of each of which are incorporated by reference herein: Joseph C. Palais, *Third Edition Fiber Optic Communications*, Prentice Hall, Englewood Cliffs, N.J., 1992; John B. Anderson, *Digital Transmission Engineering*, IEEE Press, Piscataway, N.J., 1999; Stephen B. Alexander *Optical Communication Receiver Design*, SPIE Optical Engineering Press, Bellingham, Wash., 1997; Govind P. Agrawal *Fiber-Optic Communication Systems*, John Wiley & Sons, Inc, New York N.Y., 1997; Kaminow and Koch, *Optical Fiber Telecommunication IIIA*, Academic Press Limited, 1997; and Anderson and Lyle, *Technique for Evaluating System Performance Using Q in Numerical Simulations Exhibiting Intersymbol Interference, Electronics Letters*, Vol. 30, No. 1, Jan. 6, 1994. Unfortunately, Q measurements does not provide a real-time measurement or a single-bit error detection capability.

An object of this invention is to provide a bit rate and protocol independent test apparatus and method that can be embedded on every wavelength of a communications system such as a DWDM system.

Another object of this invention is to provide a bit rate and protocol independent capability that can (1) detect a single defective bit, (2) monitor the traffic error rate and (3) provide a protection switch signal within milliseconds of exceeding the error threshold condition of the communications system.

Another object of this invention is to provide an apparatus and method for conducting eye measurements to determine the Q factor.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention preferably comprises a discrete implementation or custom Application Specific Integrated Circuit (ASIC) including the major components of a receiver, variable rate CRU (Clock Recovery Unit), and a very high speed threshold sampling module for various static or dynamic sampling points positioned in an array (two-dimensional or linear) that is able to instantaneously determine the shape of the eye of a digital communication system, and very high speed logic to process the data. This basic system meets the requirement and is the basis for a universal test set. In addition to bit error detection, it measures the frequency of the signal. Further enhancements includes creating oscilloscope eye diagrams and bit capture and post processing to identify the signal protocol by post processing. The preferred embodiment of the invention has particular application in optical communications systems, such as DWDM optical systems, employing an optical receiver; however, the invention may be incorporated into various other types of digital communication systems employing various other types of receivers without departing from the spirit and scope of this invention.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifing or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawing in which.

Similar reference characters refer to similar parts throughout the several views of the drawings.

DETAILED DESCRIPTION OF THE PREFERRED EMBODIMENT

Figure 1:
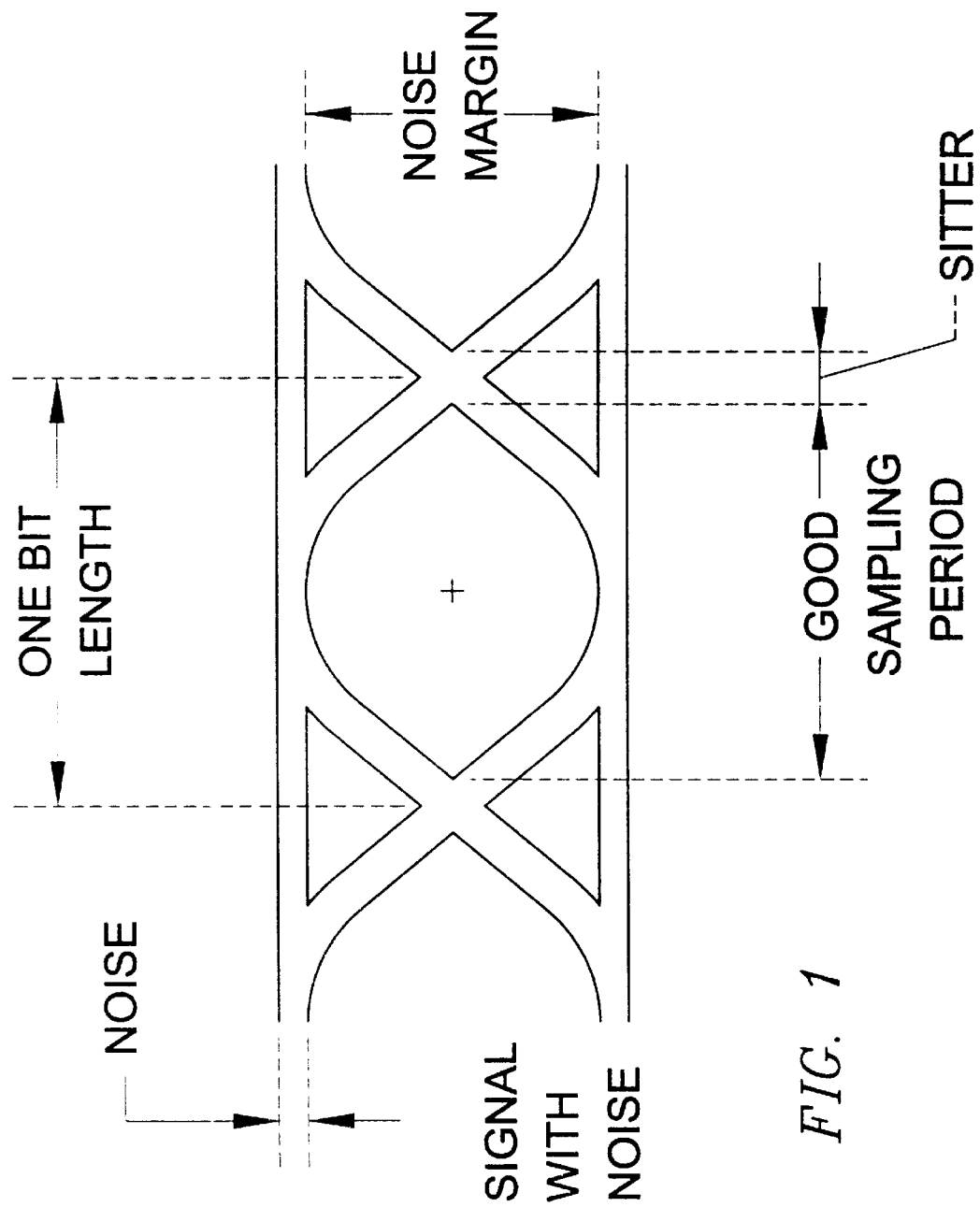
FIG. 1 is a exemplary eye diagram illustrating the various parameters thereof.
Figure 2:
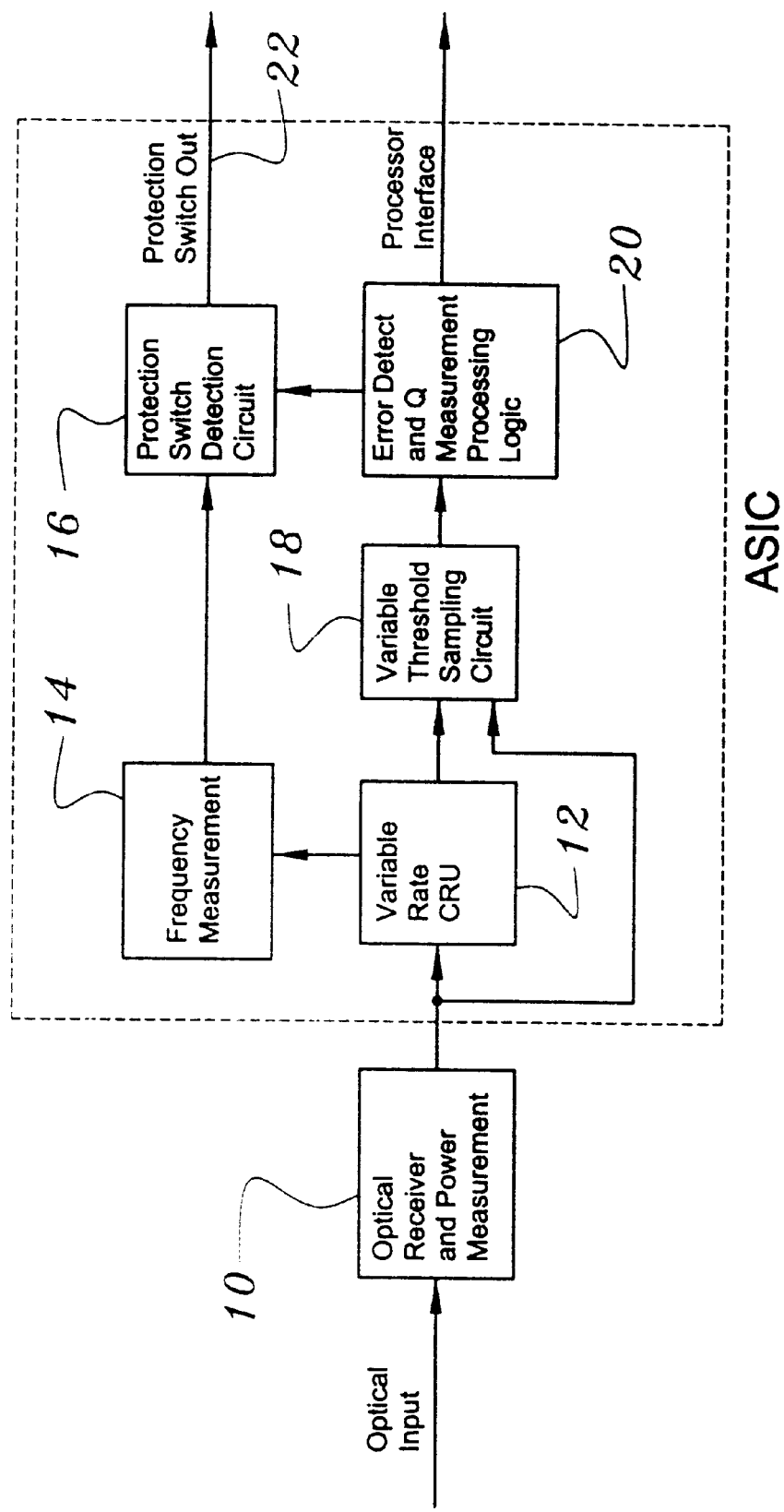
FIG. 2 is an overview block diagram of the bit rate and protocol independent test system invention.

Referring to FIG. 2, the preferred apparatus of the invention comprises an optical receiver 10 that is preferably either PIN photodiode or avalanche photodiode (APD) based, with the former providing the lower cost. The invention also comprises a variable rate Clock Recovery Unit (CRU) 12 that is preferably phase locked loop (PLL) based to provide the desired flexibility. Frequency measurement 14 of the invention preferably comprises a high speed prescaler which drives a counter and provides a timebase to a protection switch detection circuit 16. A processor (not shown) is provided to measure the length of the divided down frequency to determine the line rate.

As described below in greater detail, the variable threshold sampling circuit 18 provides a plurality of threshold detectors. The output of these threshold detectors is sampled by the recovered clock. The thresholds are set as a percentage of peak eye amplitude and may be programmable. A minimum of two threshold detectors would be required to examine every bit. One threshold would be set in the upper area of the eye (i.e., 80% of peak) and the other set in the lower area of the eye (i.e., 20%). If the signal passes between the thresholds, it is considered an error. These are counted and may be read by a processor from the Error Detect and Q Measurement Processing Logic 20. Additional threshold sampling circuits with spread thresholds may be employed to provide further resolution and grading of each bit.

The protection switch detection circuit 16 compares the counted errors in a given timebase period with a programmable threshold. If exceeded, the protection switch output 22 goes active. This allows fast response to protection switch events with minimal software delays.

Figure 3:
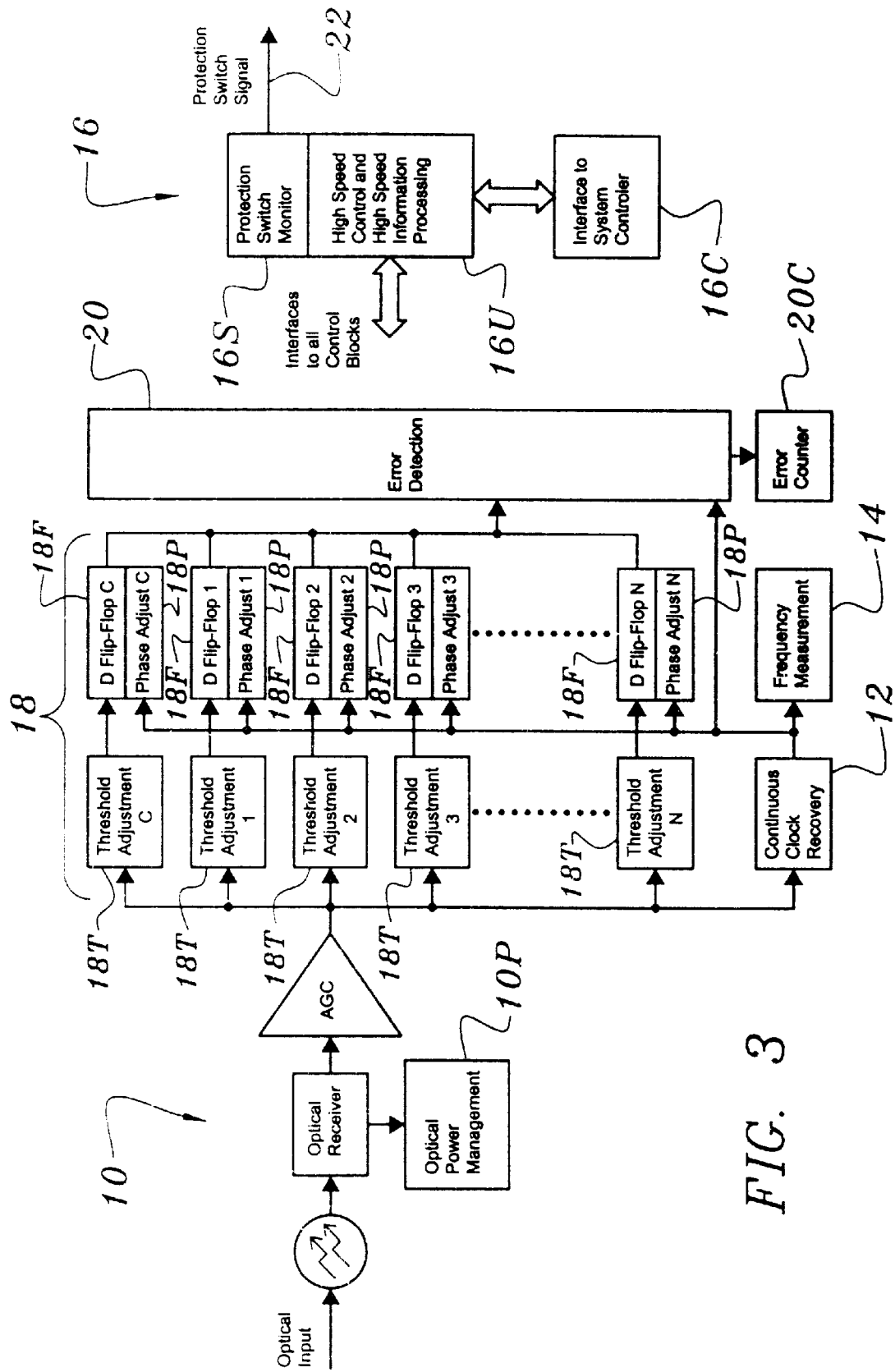
FIG. 3 is a high-block diagram of FIG. 2.

Referring now to FIG. 3, a more detailed description of the invention is presented as follows. The invention has an optical fiber input in which the incoming optical signal is fed to the optical receiver 10. The incoming optical power is measured by the power measurement block 10P. The receiver's output feeds the AGC input. The output of the AGC feeds multiple threshold adjustment blocks 18T (C and 1 through N) and the clock recovery unit 12. The clock recovery unit's clock is fed to multiple phase adjustment units 18P (C and 1 through N) that respectively control the clock feeding of multiple D Flip-Flops 18F (C and 1 through N) corresponding to the center data point C of the eye (see FIG. 4) and a plurality of arrayed data points (1 through N) positioned in an array about the other areas of the eye. The clock recovery unit also feeds the frequency measurement unit 14. The D Flip-Flops 18F are fed into an error detection circuit 20. The error detection circuit 20 feeds the error counter 20C. A high-speed control unit 16 controls all the threshold and phase adjustments. A high-speed information processing unit 16U processes all the incoming data. The protection switch unit 16S processes all the needed information and provides the protection switch signal 22. The interface unit provides an interface to the system controller 16C.

Figure 5:
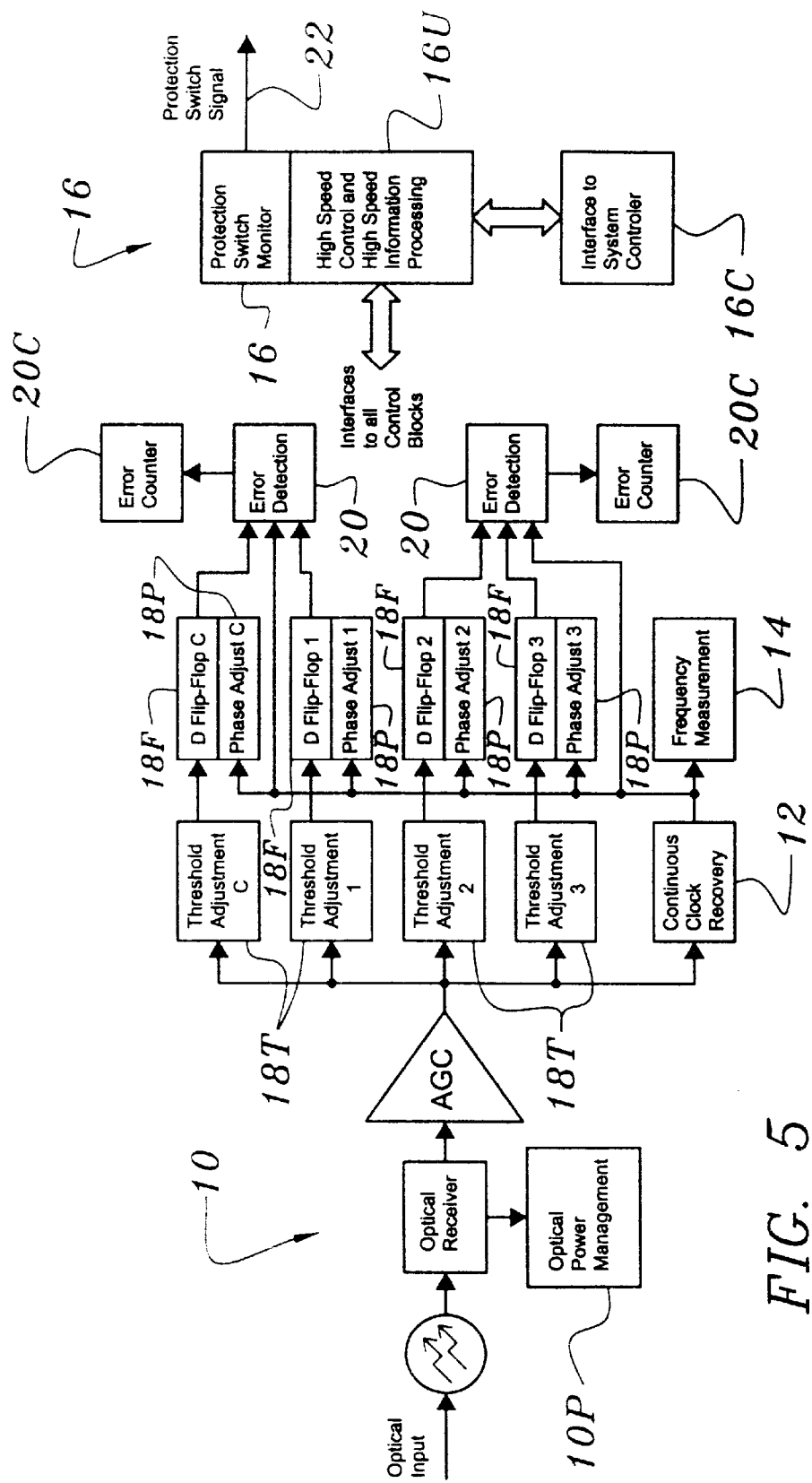
FIG. 5 is the anticipated initial implementation of FIG. 3.

The anticipated first implementation of the invention is disclosed in FIG. 5 that employs the CRU produced by Vitesse Semiconductor Corp. as disclosed in the article McCormack, *Intelligent Data Recovery, Communication Systems Design*, December, 1999, the disclosure of which is incorporated by reference herein, wherein the D Flip-Flops 18F and phase adjustment units 18P are "paired" and in which a error detection 20 and counter 20C is provided for each pair.

The theory of operation for each of the components is described as follows. The input channel is the analog path that converts the optical signal into a gain adjusted analog electrical signal. This channel includes the Clock Recovery Unit (CRU) which will extract the clock from the incoming data. The optical receiver preferably comprises a PIN receiver followed by an AGC into a variable rate Clock Recovery Unit (CRU). A PIN receiver and AGC is selected to provide a more linear analog channel. The CRU is flexible and provides continuous coverage from approximately 45 Mbit/sec to 2.7 Gbit/sec. Frequency measurement consists of a high speed pre-scaler that drives a counter. The frequency will be measured against a high quality clock source to derive the incoming frequency and also provide a timebase to the protection switch circuit.

Figure 4:
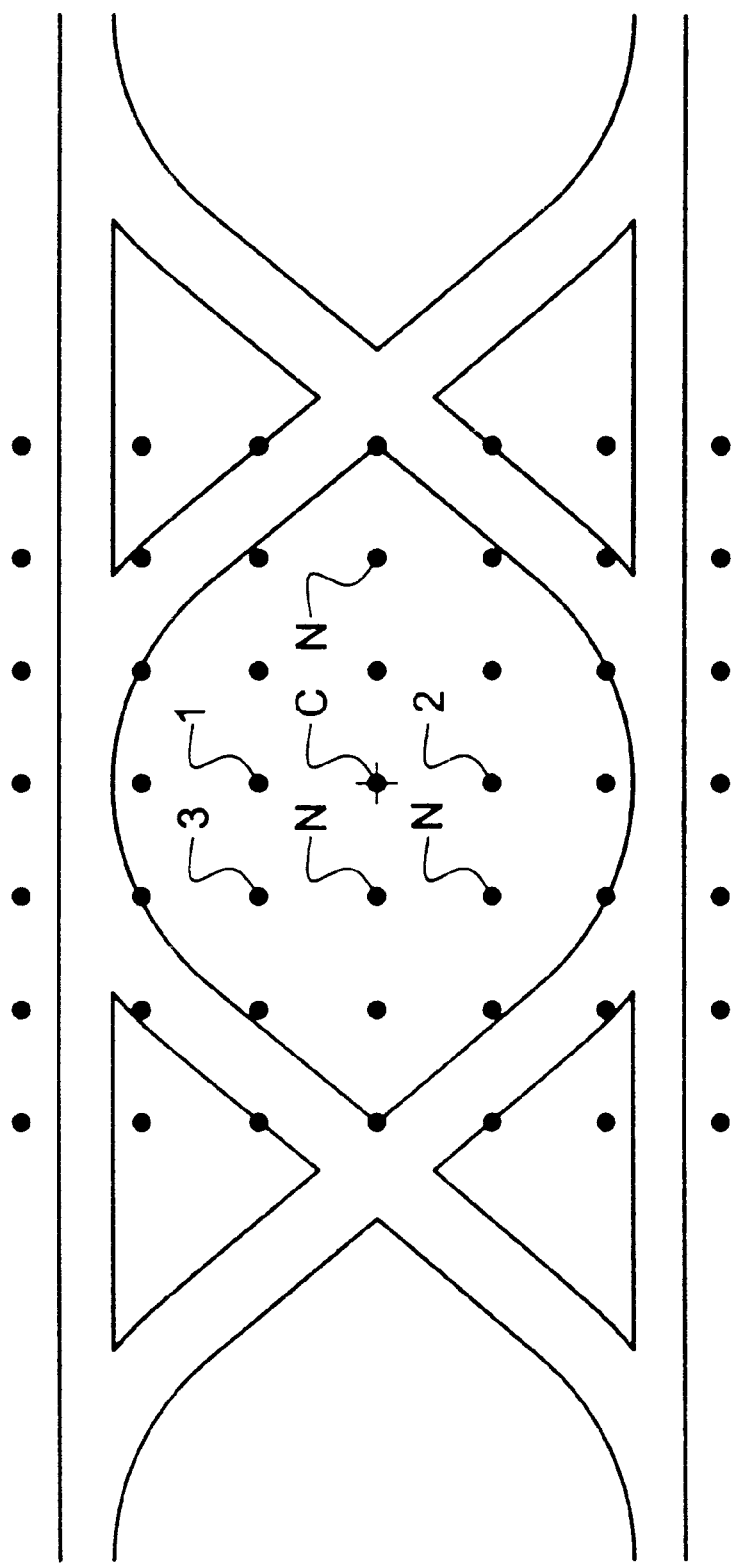
FIG. 4 is an exemplary eye diagram incorporating the invention.

The sampling block consists of a multiplicity of D Flip-Flops, such as in the anticipated first implementation, paired D Flip-Flops. There are separate controls of decision threshold and phase of the sampling clock. With control of the threshold and phase, the entire eye can be sampled or scanned across an array as shown in FIG. 4 (the number and positioning of the data points to be optimally determined). The following algorithm is provided as an example. The $1^{st}$ step is to find the optimum sampling position of the eye, typically the center C. After finding the optimum sampling position, one of the D Flip-Flops can be positioned at this location, hence the labeling "C". The other D Flip-Flop can now be used to scan around the eye to determine the margins, shape, and quality of the eye. The outputs of this sampling pair are fed to an error detection circuit that can determine bit value decision differences (decision errors) on a bit by bit real time basis.

Refer now to FIG. 4 for the example eye diagram used for the following description. Sampling point C indicates the center of the eye and point 1 indicates the point of one of the D Flip-Flop pairs. The sample point of this pair C and 1 (as well as the other individual points) can be moved around the eye independently. For example, in FIG. 5, with point C being the center of the eye, point 1 can be moved around to obtain information from the eye or left static to provide real time error information. As point 1 moves into this boundary of the eye, decision errors will start to occur. Combined with other points that may be dynamically moved around or made to remain static, many other decision errors will start to occur. By statistically processing the decision errors, eye profiling and Q measurements can be made. By fixing the relative position of the points, algorithms can be developed that will allow for accurate monitoring of the traffic BER. Importantly, the flexibility of the apparatus and method of the invention allows adaptation to the particular implementation with its inherent characteristics (i.e., satellite or microwave).

The control and processing block controls all the system adjustments and access to all the data. This block provides all real time control and data processing. Processing of the controls and error detect circuitry allows for Q measurements and BER analysis. Processing of the errors and clock rate provides a protection switch signal. The programmable nature of the invention allows the service provider to set the parameters to achieve the confidence level required by the customer before generating a protection switch signal. The bit rate affects the time and confidence level obtainable in a given time period. This trade-off is to be optimized with respect to the protection switch time.

Optical Receiver Block should support 1310 nm band and 1550 nm band input optical range and a pin receiver. It is noted that an APD receiver may be required to provide input sensitivity or a PIN receiver may be calibrated to mimic the APD's performance, thus saving the cost of an APD.

Optical Receiver Power Measurement measures the receiver optical power and the optical power from approximately 0 dBm to −35 dBm.

Automatic Gain Control (AGC) Block provides approximately 40 dB of gain range and approximately 20 mV of input sensitivity.

Threshold Adjustment Block provides approximately 64 adjustable threshold steps.

Continuous Clock Recovery Block supports input data rates from approximately 45 Mbit/sec to 2.7 Gbit/sec.

Frequency Measurement Block provides bit rate measurement, a high speed pre-scaler which drives a counter and a high quality clock reference to measure the incoming frequency against.

Phase Adjust Block provides approximately 64 adjustable phase steps.

D Flip-Flip Block provides data sampling and supports threshold adjustments and clock phase adjustments.

Error Detection Block supports error detection by comparing the D Flip-Flops outputs.

Error Counter Block supports error counting of the error detection block.

High Speed Control Block provides control of the threshold adjustment block, the phase adjustment block, the clock recovery block and the AGC block.

High Speed Information Processing Block retrieves data from the AGC block, from the threshold adjustment block, from the phase adjustment block and from the error counter block.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention. Now that the invention has been described,

What is claimed is:

1. A protocol and bit rate independent test system including means for detecting bit errors on a digital communications channel regardless of format or rate, comprising in combination:

a receiver for receiving an input;

a clock recovery unit;

a threshold sampling circuit for providing at least two threshold detectors for respective two sampling points including at least one static sampling point positioned proximate to the center of an eye pattern and at least one dynamic sampling point, the output of which are sampled by the recovered clock and if the signal passes between the thresholds, an error signal is generated and counted.

2. The protocol and bit rate independent test system as set forth in claim 1, comprising a plurality of the dynamic sampling points and wherein the dynamic sampling points are movable in an array about an eye measurement.

3. The protocol and bit rate independent test system as set forth in claim 2, wherein the array comprises a linear array.

4. The protocol and bit rate independent test system as set forth in claim 2, wherein the array comprises a two-dimensional array.

5. The protocol and bit rate independent test system as set forth in claim 1, wherein said clock recovery unit comprises a variable rate clock recovery unit.

6. The protocol and bit rate independent test system as set forth in claim 1, wherein said receiver comprises an optical receiver and wherein said input comprises an optical input.

7. The protocol and bit rate independent test system as set forth in claim 6, wherein the optical receiver is PIN photodiode based.

8. The protocol and bit rate independent test system as set forth in claim 6, wherein the optical receiver is avalanche photodiode based.

9. The protocol and bit rate independent test system as set forth in claim 1, further including frequency measurement including a high speed prescaler which drives a counter and provides a timebase to a protection switch detection circuit.

10. The protocol and bit rate independent test system as set forth in claim 9, further including a protection switch detection circuit for comparing the counted errors in a given timebase period with a programmable threshold and upon exceeding the threshold, for producing an active protection switch output.

11. The protocol and bit rate independent test system as set forth in claim 1, wherein said threshold sampling circuit comprises a variable threshold sampling circuit.

12. The protocol and bit rate independent test system as set forth in claim 1, further including an error detect and Q measurement processing logic for reading the error signals.

13. The protocol and bit rate independent test system as set forth in claim 1, further including a jitter measurement processing logic.

14. A protocol and bit rate independent test system method for detecting bit errors on a digital communications channel regardless of format or rate, comprising in combination:

receiving an input signal;

recovering the clock from the input signal;

sampling at least two sampling thresholds from the input signal for respective two sampling points including at least one static sampling point positioned proximate to the center of an eye pattern and at least one dynamic sampling point; and producing an error signal if the input signal passes between the thresholds.

15. The method as set forth in claim 14, comprising a plurality of the dynamic sampling points and wherein the dynamic sampling points are movable in an array about an eye measurement.

16. The method as set forth in claim 15, wherein the array comprises a linear array.

17. The method as set forth in claim 15, wherein the array comprises a two-dimensional array.

18. The method as set forth in claim 14, wherein the step of recovering the clock from the input signal comprises the step of recovering the clock from the input signal at a variable rate.

19. The method as set forth in claim 14, wherein the step of receiving a signal input comprises the step of receiving an optical signal input.

20. The method as set forth in claim 19, wherein the step of receiving the optical signal input employs an optical receiver.

21. The method as set forth in claim 20, wherein the optical receiver is PIN photodiode based.

22. The method as set forth in claim 21, wherein the optical receiver is avalanche photodiode based.

23. The method as set forth in claim 14, further including the step of measuring the bit rate to provide a timebase to a protection switch detection circuit.

24. The method as set forth in claim 14, wherein the step of sampling at least two sampling thresholds from the input signal comprises the step of sampling at least two variable sampling thresholds.

25. The method as set forth in claim 14, further including the step of reading the error signals.

26. The method as set forth in claim 25, wherein the step of reading the error signals employs an error detect and Q measurement processing logic.

27. The method as set forth in claim 14, further including the step of comparing the counted errors in a given timebase period with a programmable threshold and upon exceeding the threshold, producing an active protection switch output.

28. The method as set forth in claim 14, further including the step of measuring jitter.

* * * * *